April 14, 1942.  W. D. TIPTON  2,280,015
HYDRODYNAMIC TRANSMISSION
Filed Dec. 14, 1940
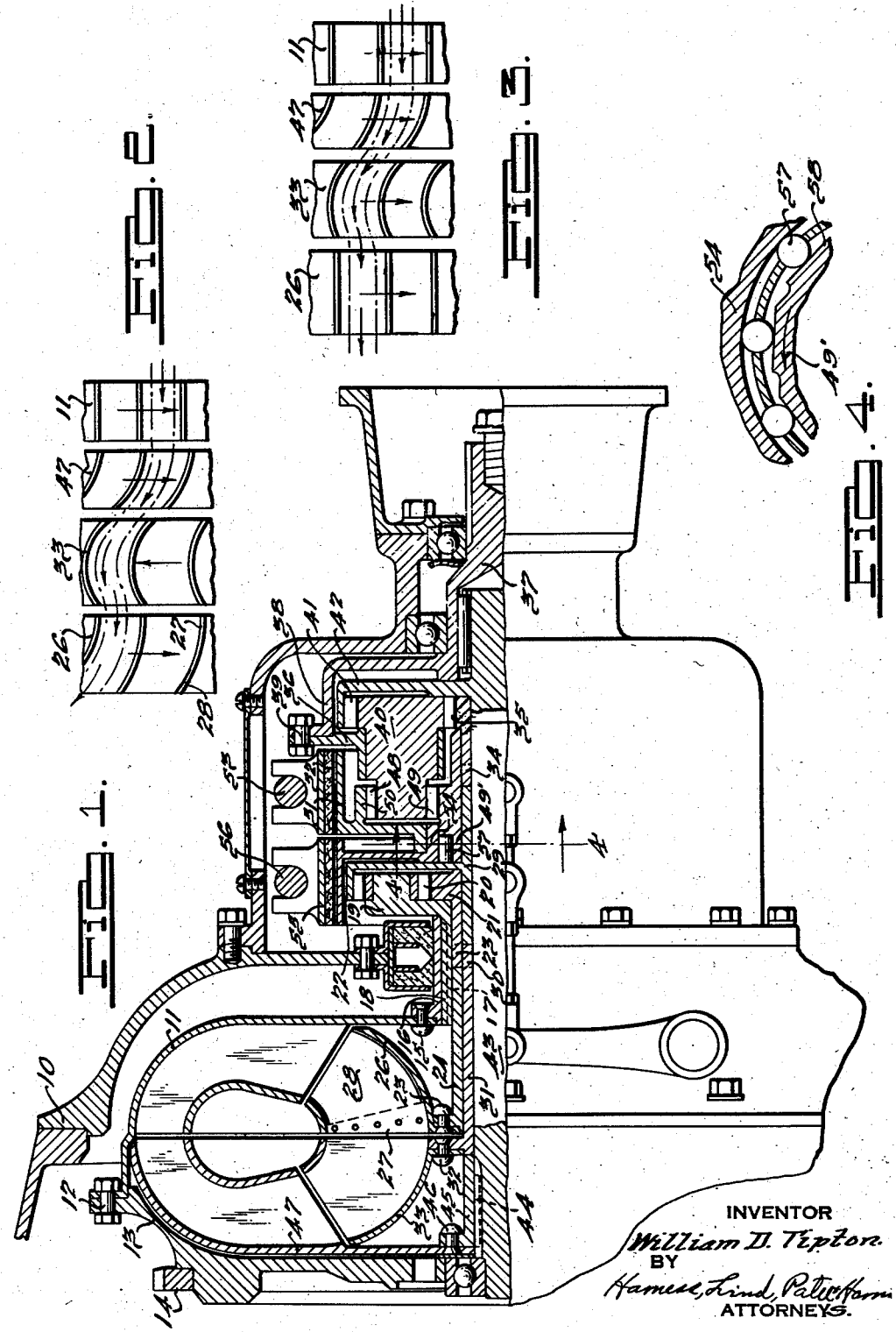
INVENTOR
*William D. Tipton.*
BY
*Hamess, Lind, Palmer Harris*
ATTORNEYS.

Patented Apr. 14, 1942 2,280,015

UNITED STATES PATENT OFFICE 2,280,015

HYDRODYNAMIC TRANSMISSION

William D. Tipton, Baltimore, Md.

Application December 14, 1940, Serial No. 370,123

22 Claims. (Cl. 74—189.5)

This application relates to hydrodynamic torque converters and particularly to converters of the type suitable for use in automotive vehicles.

Torque converters of the fluid type have been known to the prior art for several years, but their inherently low efficiency and lack of flexibility has precluded their wide use in motor vehicles.

It is the principal object of the present invention to provide a hydrodynamic transmission of improved type which possesses sufficient flexibility to make its application to automobile passenger cars feasible, and which will operate with relatively high over-all efficiency.

An additional object is to provide in such a transmission an auxiliary pump or impeller wheel for increasing the fluid circulation thereby reducing the slip at low speeds.

A further object is to provide in a transmission of the aforesaid type means for increasing the starting torque while at the same time reducing the shock losses incident to the entrance of the fluid into the vane passages of the rotatable members.

A still further object is to provide an improved means for driving the transmission output shaft from the input shaft whereby the torque transfer between said shafts is effected by both mechanical and fluid means simultaneously.

Other objects and advantages will become apparent from a reading of the following description reference being made to the accompanying drawing which illustrates a preferred embodiment of the device.

In the drawing, in which reference numerals are used to designate like parts referred to in the description:

Fig. 1 is a longitudinal vertical sectional view of the transmission.

Fig. 2 is a diagrammatic representation of the fluid circuit during the torque multiplying stage of the transmission.

Fig. 3 is a similar view representing conditions during the direct drive stage at which time the hydraulic unit is acting as a fluid slip coupling.

Fig. 4 is a fragmentary sectional view taken along the line 4—4 of Fig. 1.

Referring to the drawing, it will be seen that the transmission is housed in a casing 10 and comprises a hydraulic unit and a mechanical unit, the former having a vaned impeller or pump wheel 11 fastened by bolts 12 to an engine flywheel 13. The latter is adapted for mounting on the rear end of an engine crankshaft (not shown) and is provided with the usual starter ring gear 14.

The impeller 11 is fastened at 15 to a sleeve 16, the latter being splined at 17 to the forwardly extending cylindrical portion 18 of a planetary gear carrier 19. The carrier 19 carries a plurality of planet gears 20 which mesh respectively with a sun gear 21 and an annulus gear 22. The sun gear 21 has a forward extension connected by a dog clutch 23 with a sleeve 24 fastened at 25 to a second pump or impeller wheel 26. The latter is provided with the usual vanes 27 having flexible portions 28 of spring steel or other suitable material which will permit limited flexing to permit the vanes to adapt themselves to the fluid flow under different operating conditions.

The annulus gear 22 is formed integrally on a cylindrical member 29 connected at its forward end by dog clutch 30 to sleeve 31 which is in turn fastened at 32 to vaned member 33 which is adapted to function both as a guide or reaction wheel and as a turbine or runner wheel. The rear end of member 29 is connected by a dog clutch 34 with a sun gear 35, the latter forming part of a compound planetary gearset having the carrier 36 thereof drivingly connected to the transmission output or tail shaft 37 by an extension 38 which is bolted at 39 to said carrier.

The carrier 36 carries a plurality of planet pinions 40, each being provided with two sets of teeth of respectively different pitch diameters. The teeth 41 of larger pitch diameter mesh with the teeth of the sun gear 35 and also with the teeth of an annulus gear 42 integrally formed on a shaft 43 which is splined at 44 to a hub member 45, the latter being fastened at 46 to a vaned turbine or runner wheel 47.

The planet pinion teeth 48 are of smaller pitch diameter than teeth 41 and mesh respectively with the teeth of a sun gear 49 and an annulus gear 50. The latter is formed as an integral rearward extension of a brake drum 51 which is adapted to be engaged by a brake band 52 under the control of suitable brake applying mechanism 53. Sun gear 49 is rotatably carried by sleeve 29 and is provided with a forward extension 49' which forms one element of an overrunning brake device, the other element of which constitutes a brake drum 54. The drum 54 is adapted to be engaged by a band 55 under control of mechanism 56. A set of rollers 57 are disposed between the members 49' and 54, as illustrated in Fig. 4, and these rollers are adapted to engage cam surfaces formed on the member

49' to lock the sun gear 49 against reverse rotation (when brake band 55 is set) while freely permitting forward rotation under all conditions.

Operation of the device is as follows:

When brake bands 52 and 55 are free from their respective drums, there is no reaction point for either the hydraulic unit or the mechanical unit. Consequently, there is no drive through the transmission. This condition corresponds to neutral in the conventional sliding gear transmission.

To start the vehicle forwardly brake band 55 is set. This may be accomplished manually or by any suitable power operated means. Upon acceleration of the engine (not shown) fluid expelled from the passages of the impeller 11 strikes the vanes of runner 47 which causes the latter to rotate forwardly. Forward rotation of the runner causes forward rotation of annulus gear 42 which imparts torque to planet pinion 40. At the same time planet carrier 19 is being rotated forwardly at engine speed because of the direct connection thereof with impeller 11, and planet pinions 20 divide the engine torque between the gears 21 and 22.

The action of guide wheel 33 is auxiliary to the starting of the vehicle. This wheel, during the initial acceleration period, rotates backwardly because of the reaction of the fluid expelled from runner 47, thus the annulus gear 22 of the front planetary gearset and the sun gear 35 of the rear planetary gearset also rotate backwardly. This backward rotation of the annulus gear 22 causes the sun gear 21 to be rotated forwardly at increased speed through the action of the planet pinions 20 which in turn causes the pump wheel 26 to be rotated forwardly at a speed faster than engine speed. The wheel 26 then, functions during the starting period as an auxiliary impeller and substantially increases the velocity of fluid flow.

The backward rotation of sun gear 35 tends to impart backward rotation to the sun gear 49 through the intermediary of the compound planet pinions 40, but as the gear 49 is restrained from reverse rotation by the overrunning rollers 57 (the brake band 55 being set) the gear 49 serves as a rack and the pinions 40 roll forwardly thereon. Inasmuch as the annulus gear 42 is also rotating forwardly at the speed of the runner 47, the net result is that the carrier 36 is rotated forwardly at a reduced speed thus driving the car.

It is to be noted that the sun gear 49 serves as the reaction element for both the hydraulic and the mechanical torque conversion units, the reaction force being transmitted from the gear 49 to the guide wheel 33 through pinion 40, sun gear 35 and sleeve 29; the reaction force being transmitted from the gear 49 to the forward planetary gearset through the pinion 40, sun gear 35 and sleeve 29; and the reaction for the rear planetary gearset being supplied directly by the sun gear 49. While the guide wheel 33 rotates reversely, the rotation thereof is restricted by the brake band 55 acting through gear 49, pinion 40, gear 35 and sleeve 29. Thus reaction for the hydraulic unit is provided. As the annulus gear 22 is integral with the sleeve 29, its rotation reversely is likewise restricted and reaction for the forward planetary gearset is provided.

The conditions prevailing in the hydraulic unit during initial acceleration of the vehicle are shown diagrammatically in Fig. 2. As illustrated therein, the flexible portions 28 of the pump vanes 27 are inclined in such manner that the outflow from the passages of the pump or impeller wheel 26 is more radial than tangential. This causes the fluid to have a higher speed of circulation than would otherwise be the case which, in turn, increases the reaction between members 47 and 33, hence the torque difference between these members is increased and, as this is multiplied by the rear planetary gearset, an extremely fast acceleration is provided.

As the vehicle speeds up the relative rotation or slip between wheels 47 and 33 decreases as does the slip between the wheel 33 and the pump wheel 26. When the reaction on guide wheel 33 decreases to zero, the wheel 33 begins to rotate forwardly under the force of the fluid expelled from the passages of the runner 47 and the forward planetary gearset operates to equalize the speeds of the wheels 33 and 26, the latter slowing down as the former picks up in speed until the two are rotating at engine speed.

Forward rotation of guide wheel 33 also causes forward rotation of sun gear 35 which relieves the reaction on sun gear 49 and causes it to rotate forwardly which action is permitted by the overrunning rollers 57.

Finally, the hydraulic wheels 26, 11, 47 and 33 all reach approximately identical speed whereupon the planetary gearsets rotate as locked units and the shaft 37 is driven at approximately the speed of the flywheel 13 which condition corresponds to direct drive in a conventional transmission.

When it is desired to drive the vehicle in reverse, the brake band 55 is released and the band 52 is set. The annulus gear 50 is thereby restrained from rotation in either direction and application of torque to annulus gear 42 will cause reverse rotation of pinion 40 which, in turn, causes reverse rotation of carrier 36 and tail shaft 37, the pinion 40 rolling around the gear 50 which now functions as a rack.

The vehicle will now be driven in reverse with the hydraulic unit and the forward planetary unit functioning as described above in connection with the forward drive function. During reverse driving, the annulus gear 50 serves as the reaction element of the combined hydraulic and mechanical system instead of the sun gear 49, but the system functions similarly except that the pinion 40 rotates reversely and the torque multiplication through the rear planetary set will remain fixed because the brake band 52 causes the guide wheel 33 to be rotated reversely at all times. Direct drive in reverse can of course never be obtained because guide wheel 33 cannot rotate forwardly so long as brake band 52 is set.

It may thus be seen that I have provided a transmission that is fully automatic in operation and which provides, by means of combined hydraulic and mechanical torque multiplying means, a range of speed ratios that is substantially equivalent to that provided in conventional sliding gear transmissions. While a specific embodiment of my invention has been illustrated and described, it is desired to point out that the invention may assume many different forms and it is not desired to limit the invention in the broader aspects thereof except as set forth in the claims appended hereto.

I claim:

1. In a hydrodynamic transmission having input and output structures, a hydraulic pump wheel carried by said input structure; a planet carrier also carried by said input structure; a planet pinion carried by said carrier; sun and annulus gears respectively meshing with said pinion; a pair of vaned hydraulic wheels disposed in juxtaposition and connected respectively to said sun and annulus gears for rotation therewith; a vaned runner wheel connected to the output structure and disposed in such relation with respect to said pump wheel that it receives the discharge therefrom; and means for restricting rotation of said annulus gear in the direction of rotational tendency thereof caused by fluid reaction imposed on the hydraulic wheel connected thereto.

2. In a hydrodynamic transmission having input and output structures, a hydraulic pump wheel carried by said input structure; a planet carrier also carried by said input structure; a planet pinion carried by said carrier; sun and annulus gears respectively meshing with said pinion; a second pump wheel connected to said sun gear; a guide wheel connected to said annulus gear; a runner wheel connected to said output structure; and means for restricting rotation of said annulus gear in the direction of rotational tendency thereof caused by fluid reaction on said guide wheel.

3. In a hydrodynamic transmission having input and output structures, a hydraulic pump wheel carried by said input structure; a planet carrier also carried by said input structure; a planet pinion carried by said carrier; sun and annulus gears respectively meshing with said pinion; a second pump wheel connected to said sun gear; a guide wheel connected to said annulus gear; a runner wheel connected to said output structure; and means for restricting rotation of said annulus gear in the direction of rotational tendency thereof caused by fluid reaction on said guide wheel comprising brake means automatically releasable to permit rotation of said guide wheel in the opposite direction of rotational tendency thereof.

4. In a hydrodynamic transmission having input and output structures, a hydraulic pump wheel carried by said input structure; a planet carrier also carried by said input structure; a planet pinion carried by said carrier; sun and annulus gears respectively meshing with said pinion; a pair of vaned hydraulic wheels disposed in juxtaposition and connected respectively to said sun and annulus gears for rotation therewith; a runner wheel connected to said output structure; means for restricting rotation of said annulus gear in the direction of rotational tendency thereof caused by fluid reaction on the hydraulic wheel connected thereto; the speed ratio relationship between said gears being such that upon rotation of said input structure, the hydraulic wheel connected with said sun gear is rotated at an overspeed relative thereto.

5. In a hydrodynamic transmission having input and output structures, a hydraulic pump wheel carried by said input structure; a planet carrier also carried by said input structure; a planet pinion carried by said carrier; sun and annulus gears respectively meshing with said pinion; a second pump wheel connected to said sun gear; a guide wheel connected to said annulus gear; a runner wheel connected to said output structure; means for restricting rotation of said annulus gear in the direction of rotational tendency thereof caused by fluid reaction on said guide wheel; the speed ratio relationship between said gears being such that, upon rotation of said input structure, said second pump wheel is driven at an overspeed relative to said first pump wheel.

6. In a hydrodynamic transmission having input and output structures, a hydraulic pump wheel carried by said input structure; a planet carrier also carried by said input structure; a planet pinion carried by said carrier; sun and annulus gears respectively meshing with said pinion; a second pump wheel connected to said sun gear; a guide wheel connected to said annulus gear; a runner wheel connected to said output structure; means for restricting rotation of said annulus gear in the direction of rotational tendency thereof caused by fluid reaction on said guide wheel; the speed ratio relationship between said gears being such that, upon rotation of said input structure, said second pump wheel is driven at an overspeed relative to said first pump wheel; said restraining means including means automatically operable to release said annulus gear for rotation in a direction opposite to the aforesaid rotational tendency.

7. In a hydrodynamic transmission having input and output structures, a hydraulic pump wheel carried by said input structure; a planet carrier also carried by said input structure; a planet pinion carried by said carrier; sun and annulus gears respectively meshing with said pinion; a second pump wheel connected to said sun gear; a guide wheel connected to said annulus gear; a runner wheel connected to said output structure; said respective wheels being so arranged with respect to each other that the fluid flows from said first pump wheel to said runner wheel, thence to said guide wheel, thence to said second pump wheel; and means for restricting rotation of said annulus gear in the direction of rotational tendency thereof caused by fluid reaction on said guide wheel.

8. In a hydrodynamic transmission having input and output structures; a hydraulic pump wheel driven by and at the speed of said input structure; a planetary gearset including a planet carrier driven by and at the speed of said input structure; a planet pinion carried by said carrier; a sun gear meshing with said pinion; a second hydraulic pump wheel connected with said sun gear, the disposition thereof being such that said second pump wheel discharges into said first pump wheel; an annulus gear meshing with said pinion; a hydraulic reaction wheel connected with said annulus gear and so disposed that it discharges into said second pump wheel, and a hydraulic runner wheel connected to said output structure, said runner wheel being disposed in such manner that it receives the discharge from said first pump wheel and discharges into said reaction wheel.

9. In a hydrodynamic transmission having input and output structures; a hydraulic pump wheel driven by and at the speed of said input structure; a planetary gearset including a planet carrier driven by and at the speed of said input structure; a planet pinion carried by said carrier; a sun gear meshing with said pinion; a second hydraulic pump wheel connected with said sun gear the disposition thereof being such that said second pump wheel discharges into said first pump wheel; an annulus gear meshing with said pinion; a hydraulic reaction wheel connected with said annulus gear and so disposed that it discharges into said second pump wheel, a hydraulic runner wheel connected to said output structure and so disposed that it discharges into said reaction wheel and means for restricting rotation of said annulus gear in the direction of rotational tendency thereof caused by fluid reaction on said reaction wheel whereby said second pump wheel is caused to rotate at an overspeed relative to said first pump wheel during acceleration of the output structure.

10. In a hydrodynamic transmission having input and output structures; a hydraulic pump wheel driven by and at the speed of said input structure; a planetary gearset including a planet carrier driven by and at the speed of said input structure; a planet pinion carried by said carrier; a sun gear meshing with said pinion; a second hydraulic pump wheel connected with said sun gear the disposition thereof being such that said second pump wheel discharges into said first pump wheel; an annulus gear meshing with said pinion; a hydraulic reaction wheel connected with said annulus gear and so disposed that it discharges into said second pump wheel, a hydraulic runner wheel connected to said output structure and so disposed that it discharges into said reaction wheel, means for restricting rotation of said annulus gear in the direction of rotational tendency thereof caused by fluid reaction on said reaction wheel whereby said second pump wheel is caused to rotate at an overspeed relative to said first pump wheel during acceleration of the output structure; said restraining means including means operable automatically in response to decreased torque demand at said output structure to release said reaction wheel for rotation in a direction opposite to the direction of the aforesaid rotational tendency thereby to permit said hydraulic wheels to rotate at uniform speed.

11. In a hydrodynamic transmission having input and output structures, a hydraulic pump wheel carried by said input structure; a planet carrier also carried by said input structure; a planet pinion carried by said carrier; sun and annulus gears respectively meshing with said pinion; a pair of vaned hydraulic wheels disposed in juxtaposition and connected respectively to said sun and annulus gears for rotation therewith; a runner wheel disposed in driving relation with respect to said pump wheel; means including a planetary gearset for connecting said runner wheel to said output structure; and means for controlling rotation of the planet pinions of said gearset whereby a combined hydraulic and mechanical torque multiplication is effected.

12. In a hydrodynamic transmission having input and output structures, a hydraulic pump wheel carried by said input structure; a planet carrier also carried by said input structure; a planet pinion carried by said carrier; sun and annulus gears respectively meshing with said pinion; a pair of vaned hydraulic wheels disposed in juxtaposition and connected respectively to said sun and annulus gears for rotation therewith; a runner wheel disposed in driving relation with respect to said pump wheel; a second annulus gear connected with said runner wheel; a second planet carrier connected with said output structure having pinions in mesh with said second annulus gear; a second sun gear in mesh with said last mentioned planet pinions; means connecting said first annulus gear and said second sun gear for rotation in unison; and means for controlling rotation of said last mentioned planet pinions in such manner that combined hydraulic and mechanical torque multiplication is provided between said structures.

13. In a hydrodynamic transmission having input and output structures, a hydraulic pump wheel carried by said input structure; a planet carrier also carried by said input structure; a planet pinion carried by said carrier; sun and annulus gears respectively meshing with said pinion; a pair of vaned hydraulic wheels disposed in juxtaposition and connected respectively to said sun and annulus gears for rotation therewith; a runner wheel disposed in driving relation with respect to said pump wheel; a second annulus gear connected with said runner wheel; a second planet carrier connected with said output structure having pinions in mesh with said second annulus gear; a second sun gear in mesh with said last mentioned planet pinions; means connecting said first annulus gear and said second sun gear for rotation in unison; and means including a third sun gear disposed in mesh with said last mentioned pinions for controlling rotation thereof whereby a reaction point for both said hydraulic system and said mechanical system is provided.

14. In a hydrodynamic power transmission having input and output structures, a first pump wheel, a runner wheel, a guide wheel and a second pump wheel disposed in serially juxtaposed relation; means drivingly connecting said input structure to said first pump wheel; a first planetary gearset including a carrier connected with said first pump wheel and carrying a planet pinion, a sun gear connected with said second pump wheel and an annulus gear connected with said guide wheel; a second planetary gearset including a carrier connected with said output structure and carrying a planet pinion, an annulus gear connected with said runner wheel and a sun gear connected with said guide wheel; a third planetary gearset having included as elements thereof the carrier and planet pinion of said second planetary gearset; and brake means operable at the will of the operator for restraining rotation of either the sun gear or the annulus gear of said third gearset thereby to provide forward or reverse drive respectively of said output structure.

15. The combination set forth in claim 14 wherein the brake means also includes means automatically operable only during forward driving for releasing said third sun gear for forward rotation whereby a step-up in the transmission driving ratio may be effected.

16. The combination set forth in claim 14 wherein the brake means also includes means automatically operable only during forward driving for releasing said third sun gear for forward rotation whereby a step-up in both the hydraulic and mechanical driving ratio is effected.

17. In a hydrodynamic power transmission having input and output structures, a first pump wheel, a runner wheel, a guide wheel and a second pump wheel disposed in serially juxtaposed relation; means drivingly conecting said input structure to said first pump wheel; a first planetary gearset including a carrier connected with said first pump wheel and carrying a planet pinion; a sun gear connected with said second pump wheel and an annulus gear connected with said guide wheel; a second planetary gearset including a carrier connected with said output structure and carrying a planet pinion, an annulus gear connected with said runner wheel and a sun gear connected with said guide wheel, the planet pinion thereof being provided with an extra set of teeth meshing with a third sun gear and a third annulus gear respectively; and means for selectively locking said last gears against rotation whereby forward or reverse drive is established.

18. In a hydrodynamic power transmission having input and output structures, a first pump wheel, a runner wheel, a guide wheel and a second pump wheel disposed in serially juxtaposed relation; means drivingly connecting said input structure to said first pump wheel; a first planetary gearset including a carrier connected with said first pump wheel and carrying a planet pinion, a sun gear connected with said second pump wheel and an annulus gear connected with said guide wheel; a second planetary gearset including a carrier connected with said output structure and carrying a planet pinion, an annulus gear connected with said runner wheel and a sun gear connected with said guide wheel, the planet pinion thereof being provided with an extra set of teeth; a sun gear disposed in mesh with said extra set of teeth; and means for restraining rotation of said last sun gear thereby to provide reaction for said guide wheel, said first planetary gearset and said third planetary gearset.

19. In a hydrodynamic transmission having input and output structures, a hydraulic pump wheel carried by said input structure; a planet carrier also carried by said input structure; a planet pinion carried by said carrier, sun and annulus gears respectively meshing with said pinion, a pair of vaned hydraulic wheels disposed in juxtaposition and connected respectively to said sun and annulus gears for rotation therewith, a vaned runner wheel connected to the output structure and disposed in such relation with respect to said pump wheel that it receives the discharge therefrom, a second sun gear connected for rotation in unison with said annulus gear, a third sun gear, a second planet pinion having two sets of teeth thereon meshing respectively with the second and third sun gears, and means for locking said third sun gear against rotation in one direction, said means being automatically releasable to permit rotation thereof in the opposite direction.

20. In a hydrodynamic transmission having input and output structures, a hydraulic pump wheel carried by said input structure; a planet carrier also carried by said input structure; a planet pinion carried by said carrier, sun and annulus gears respectively meshing with said pinion, a pair of vaned hydraulic wheels disposed in juxtaposition and connected respectively to said sun and annulus gears for rotation therewith, a vaned runner wheel connected to the output structure and disposed in such relation with respect to said pump wheel that it receives the discharge therefrom, a second sun gear connected for rotation in unison with said annulus gear; a planet pinion having two sets of teeth formed thereon, one set being disposed in mesh with said second sun gear; sun and annulus gears respectively disposed in mesh with the other set of teeth of said pinion and selectively operable means for controlling rotation of said last named sun and annulus gears respectively whereby either forward or reverse rotation may be imparted to said output structure.

21. The combination set forth in claim 1 wherein one of the juxtapositioned hydraulic wheels is provided with vanes having flexible portions so arranged that they are adapted for inclination by the hydraulic fluid during acceleration of the output structure to increase the radial component of the fluid flow.

22. The combination set forth in claim 4 wherein one of the juxtapositioned hydraulic wheels is provided with vanes having flexible portions so arranged that they are adapted for inclination by the hydraulic fluid during acceleration of the output structure to increase the radial component of the fluid flow.

WILLIAM D. TIPTON.